United States Patent [19]
Bauman et al.

[11] Patent Number: 5,895,053
[45] Date of Patent: *Apr. 20, 1999

[54] SEAL FOR GAS SPRINGS AND THE LIKE

[75] Inventors: Walter Douglas Bauman, Myrtle Beach; James B. Chamberlin, Charlotte; Jack R. Roach; Mark S. Jeffries, both of Florence, all of S.C.; Richard M. Boyd, St. Louis Park, Minn.

[73] Assignee: AVM, Inc., Marion, S.C.

[*] Notice: This patent issued on a continued prosecution application filed under 37 CFR 1.53(d), and is subject to the twenty year patent term provisions of 35 U.S.C. 154(a)(2).

[21] Appl. No.: 08/726,124

[22] Filed: Oct. 4, 1996

[51] Int. Cl.$^6$ .............................. F16J 15/32; F16J 15/56
[52] U.S. Cl. .................... 277/566; 277/568; 277/585
[58] Field of Search ..................... 277/176, 188 R, 277/188 A, 198, 199, 207 R, 208, 209, 211, 566, 568, 584, 585, 589, 910, 946; 267/64.11; 188/322.17

[56] References Cited

U.S. PATENT DOCUMENTS

| | | |
|---|---|---|
| 2,909,398 | 10/1959 | Taylor ............................ 277/209 |
| 2,918,336 | 12/1959 | Works et al. .................. 277/188 R |
| 3,052,478 | 9/1962 | Horvereid ........................ 277/209 |
| 3,319,661 | 5/1967 | Shindler ........................ 277/188 R |
| 3,472,523 | 10/1969 | Rentschler et al. ............. 277/209 |
| 3,521,893 | 7/1970 | Josephson ...................... 277/188 A |
| 4,089,534 | 5/1978 | Litherland ........................ 277/198 |
| 4,576,386 | 3/1986 | Benson et al. ................ 277/188 A |
| 4,921,225 | 5/1990 | Ludwig ......................... 188/322.17 |
| 4,946,143 | 8/1990 | Bauer et al. ................. 188/322.17 |
| 5,346,230 | 9/1994 | Schumacher et al. ......... 277/188 R |

FOREIGN PATENT DOCUMENTS

| | | | |
|---|---|---|---|
| 1288665 | 9/1972 | United Kingdom | 277/188 A |
| 1409266 | 10/1975 | United Kingdom | 277/188 A |

Primary Examiner—Anthony Knight
Assistant Examiner—John L. Beres
Attorney, Agent, or Firm—McAndrews, Held & Malloy, Ltd.

[57] ABSTRACT

A seal that is particularly suitable for use in a gas spring and other high pressure hydraulic and pneumatic sealing applications and that minimizes the leakage of relatively high pressure gas and lubricating oil from the rod end of the gas spring or other applications. The generally annular seal body includes a number of convex sealing lobes on its radially inwardly and outwardly facing surfaces. All of the sealing lobes have a predetermined radius and project radially beyond the plane of their respective surfaces. The axial facing surfaces of the seal body are generally flat or non-concave. The seal also includes a wiper insert secured in a recess in one corner of the radially inwardly facing surface of the seal body. When the seal body is compressed between the relatively movable, annularly spaced piston rod and cylinder, the compression induced stress in the seal causes the seal body and insert to form an effective gas and oil seal.

19 Claims, 3 Drawing Sheets

SEAL FOR GAS SPRINGS AND THE LIKE

BACKGROUND OF THE INVENTION

The present invention relates to gas and oil seals that are particularly adapted for use in gas springs and in other high pressure hydraulic and pneumatic sealing applications. More specifically, the seal of the present invention advantageously minimizes the leakage of relatively high pressure gas and lubricating oil between an annularly spaced, axially relatively movable cylinder and piston rod, and hence, from the rod end of the cylinder.

The basic structure and theory of operation of gas springs has long been known. Gas springs include a piston and a cylinder, both having a relatively small diameter, usually under two inches. The piston is designed to move relatively within and with respect to the cylinder and is connected with one end of a piston rod that extends out of the normally sealed, rod end of the cylinder. The other end of the piston rod is usually connected with a device upon which the gas spring exerts force when the spring is actuated. The other, closed end of the cylinder is charged with a relatively high pressured gas, generally nitrogen, and usually at a pressure usually between 500–3,000 psi. Lubricating oil is normally also introduced into the closed end of the cylinder at the time of the gas spring's manufacture.

To be commercially acceptable, it has long been recognized by those in the gas spring art that a gas spring must include a seal that minimizes the leakage of the high pressure gas—and in most instances, the lubricating oil—from the rod end of the cylinder. This gas spring seal must effectively seal around the piston rod as well as between the piston rod and the cylinder, or more specifically the inner cylinder wall.

For this purpose, currently available gas springs generally use so-called "lip" seals or so-called "quad" seals. Examples of such quad seals are disclosed in U.S. Pat. Nos. 3,550,990 and 4,693,343. Such quad seals are normally employed in combination with a metal bushing member and a plastic, usually polytetrafluroethane ("PTFE"), washer. The washer is used to prevent the extrusion of the seal as disclosed in the latter patent.

Over the past decade or so, gas springs have been increasingly used in automotive vehicles in lieu of mechanical springs. For example, gas springs are now commonly used to hold open trunk hoods, deck lids, hatch doors (in hatch back type vehicles) and the rear doors or gates of minivans and sport utility vehicles.

The design and manufacture of gas springs for automotive usages pose unique, special problems for gas springs manufacturers, particularly in view of the large numbers of gas springs that must be manufactured to exacting specifications by mass production techniques and machinery. Additionally, and increasingly within the past several years, enormous pressures have been exerted by automotive manufacturers to have gas spring manufacturers reduce their manufacturing costs while, at the same time, enhance the quality of their gas springs.

One of the problems confronting gas spring manufacturers is the range of environmental conditions under which the gas springs are used and their sometimes irregular usage. For instance, gas springs are expected to function satisfactorily in the heat of summer and in the cold of winter even when, for example, a trunk hood may be opened by an elderly person who only uses his or her vehicle infrequently.

To enable gas springs to function as intended in an automotive environment, the gas pressure of the spring (that is, the output force exerted by the spring) must be maintained substantially constant throughout the anticipated life of the gas spring. It is imperative then that leakage of gas from the gas spring cylinder be minimized, both when the gas spring is being used, that is, when it is in a dynamic state or mode, and when it is not being used, that is, when it is static. No one is "happy" when a trunk cover fails to remain in its open position even if the vehicle is over five years old.

Leakage of the lubricating oil from the gas springs cylinders has also been becoming an increasingly serious problem as gas springs are more often used in passenger occupying parts of vehicles, oil "spots" in their vehicles, particularly when the spots are where children or pets are likely to be. Acceptable gas spring seals must now minimize both dynamic and static oil losses.

Only a decade or so ago, the standards for gas springs, set by automotive manufacturers, were losses of less than a 5% output force/gas charge and 3.0 cc. oil per 10,000 cycles. Losses of less than a 5% output force/gas charge and 0.3 cc. oil per 50,000 cycles are now the targeted standards. Automotive manufacturer would like in the future to extend the standards to 100,000 cycles as the life expectancy of automotive vehicles is extended.

Another problem long facing gas spring manufacturers is the reduction of the high static frictional ("stiction") or break-a-way force, that is, the force required to "unstick" the seal when the initial relative movement between the cylinder and the piston rod occurs. This problem is significant in gas springs and hydraulic/pneumatic suspension applications where it is important to minimize high initializing force spikes and resulting seal instability due to long delays between cycles. Such delays are especially common in gas springs employed in automotive vehicles.

Further, dynamic friction may contribute to accelerated seal failures during high frequency low amplitude cycling (typically 3 mm×20 Hz). This is associated with "gate dance" which occurs when the vehicle encounters irregular road surface conditions.

Those working in the gas spring art have recognized that currently available gas spring seals, and even the better performing quad seals, have inherent weakness or limitations. For instance, the current, commercially available seals remain prone to relatively high static and dynamic oil losses and has high "stiction" or static break-a-way forces. It has been a longstanding goal in this art to overcome these weaknesses, to extend the cycle life for effective gas spring seals, and to reduce significantly the cost of manufacturing gas springs even further.

SUMMARY OF THE INVENTION

In principal aspects, the gas spring seal of the present invention employs a unique materially hybrid, asymmetrical/symmetrically energized seal body and "wiper" insert design that controls the distinct sealing requirements of high pressure gas and oil in a novel manner and that minimizes the dynamic leakage of the gas and oil out of the gas spring cylinder to a much greater extent than current, commercially available seals. More specifically, the improved seal of the present invention performs beyond the currently targeted standards of losses of less than 5% output force/gas charge and 0.3 cc oil per 50,000 cycles. Moreover, tests indicate that the improved seals advantageously reduces losses to less than 3.0% output force/gas charge per 100,000 cycles (where a 30.0% loss would be typical of current seals) and to less than 0.1 cc oil per 100,000 cycles (where a 10.0 cc loss per 100,000 cycles would be typical of current seals). Additionally, the improved seal is capable of reducing static friction ("stiction") or break-a-way forces to values approaching zero; of handling extreme pressure differential exceeding 200 atmospheres; and of reducing friction and permeation leakage as compared to current seals.

Further, and as compared with rod end bushing assemblies which utilize current quad seals and Teflon washers as components, the improved seal of the present invention permits significant manufacturing and assembly economies. Since in some respects, the improved seal, in effect, integrally combines the quad seal and Teflon washer concepts, the rod end bushing component count, using the present inventive seal, is reduced by one-third. The design of the improved seal is also compatible with parametric scaling techniques that allow rapid and facile development of alternate ID/OD designs as market opportunities present themselves.

The improved seal of the present invention retains the fault tolerant redundance, but now the geometrically optimized sealing surfaces of prior quad seal designs and is thus able to bridge both rod and cylinder wall imperfections. The incorporation of the unique, integrated and energized wiper insert further prevents external contaminants (such as road grits and salts) from entering and compromising the gas spring system. Further the energizing design of the improved seal enables both the wiper insert and the seal body to replenish or "heal" damaged or worn areas.

Accordingly, it is a principal object of the present invention to provide an enhanced gas spring, which has an annularly spaced, relatively movable piston rod and cylinder, and which contains the relatively high pressured gas and lubricating oil by employing a novel and improved piston rod and cylinder seal so as to minimize the leakage of the gas and oil from the rod end of the gas spring.

Another object of the present invention is to provide an improved gas spring seal, as described, where the gas spring seal includes a generally annular seal body which is made of an elastomeric material, such as rubber, and which has an axis generally parallel to the axis of relative movement of the piston rod and cylinder; where the seal body also has a first, inwardly facing surface which is adapted to be disposed about and in compression contact with the gas spring piston rod, a second, radially outwardly facing surface which is adapted to be disposed within and in compression contact with the gas spring cylinder, a third, axial facing surface which is adapted to be exposed to the relatively high gas pressure in the cylinder, and a fourth, axial facing surface which is adapted to be exposed to the relatively lower pressure, as for example, atmospheric pressure; where the seal body further has a first, generally annular sealing lobe at the intersection of its first and third surfaces, a second, generally annular sealing lobe at the intersection of its second and third surfaces, a third, generally annular sealing lobe at the intersection of its second and fourth surfaces, a fourth, generally annular sealing lobe in its second surface between the second and third lobes, and a fifth, generally annular sealing lobe in its first surface approximately midway between the planes of the third and fourth axial facing surfaces; where the seal body still further has a generally annular recess in the seal body adjacent to the "intersection" of its first and fourth surfaces and adjacent to the fifth lobe; and where a generally annular wiper insert which is made of a relatively flowable plastic, such as PTFE, and which is disposed in the recess, with the insert having a radially inwardly facing surface that has a radially inwardly disposed first corner edge; and where the size and shape of the seal body, including its surfaces and sealing lobes, are such that when the seal is disposed for sealing between the gas spring piston rod and cylinder, stress will be induced in the body, primarily from its compression between the cylinder and piston rod and from the gas loading, whereby the leakage of gas between the body and the cylinder and between the body and piston rod will be minimized and the first surface of the insert will bear against a piston rod so as to minimize the leakage of oil between the first surface and the piston rod.

Still another object of the present invention is to provide an improved seal, as described, where the third and fourth axial facing surfaces are generally flat or crowned (non-concave) so as to be generally perpendicular to the axis of movement of piston rod and cylinder when the seal body is unstressed. Yet another object of the present invention is to provide an improved seal, as described, where the unstressed sealing lobes are generally convex in shape; where the unstressed radially outwardly facing surface between the second and fourth lobes, and between the third and fourth lobes, and the unstressed radially inwardly facing surface between the first and fifth lobes are generally at least in part concave; and where the radii of the sealing lobes are all generally the same and are equal to or less than about 0.019 inches. A further related object of the present invention is to provide an improved seal, as described, where the stress induced in the seal body when the seal is disposed in a gas spring, due to the relative radial ID dimensions between the first surface and the OD of the piston rod is relatively small and the stress induced in the seal body, due to the compressive forces imposed on the body by the ID of the cylinder and the OD of the piston rod is relatively high.

Yet a further object of the present invention is to provide an improved seal, as described, where the insert includes an axial facing surface that is co-planar with the unstressed fourth axial surface; where the first corner edge of the insert is adjacent to the fifth sealing lobe; and where the intersection of the axial facing surface and the radially inwardly facing surface of the insert defines a second corner edge that is disposed in the plane of the unstressed fourth surface.

Further advantages, objects, and benefits of the present invention will become apparent from the following description of the preferred embodiment of the present invention, made in connection with the drawings described below.

DESCRIPTION OF THE PREFERRED EMBODIMENT

Figure 1:
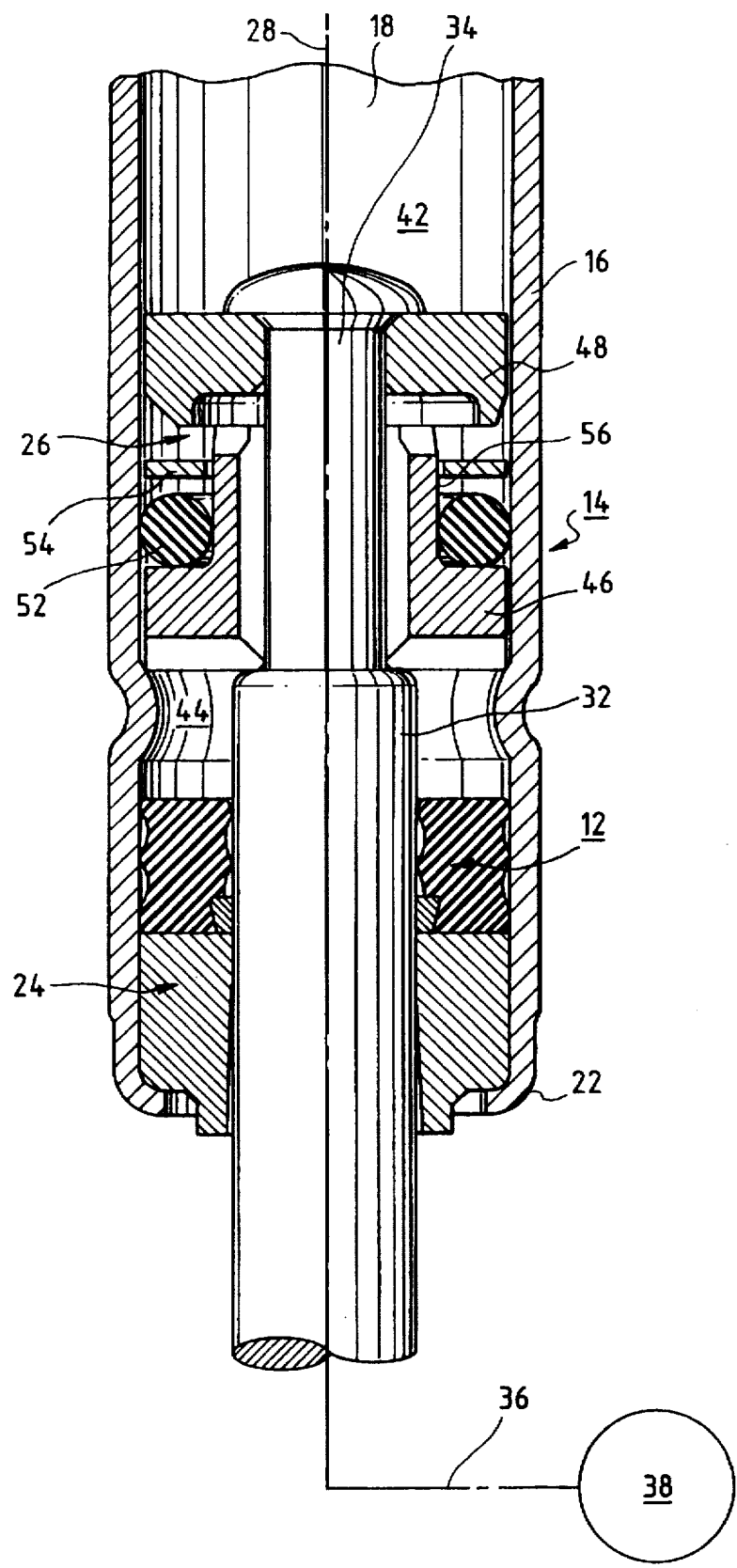
FIG. 1 is a partial, elevational view of a gas spring, with parts thereof broken away, showing an improved seal to the present invention disposed, in an unstressed state, in the gas spring.

Referring now to FIG. 1, a preferred embodiment of the improved seal 12 of the present invention is illustrated as it is disposed for use in a gas spring 14. Except for the seal 12, the spring 14 is otherwise of conventional design and construction.

More specifically, the gas spring 14 includes a cylinder 16 that has a closed end 18 and a rod end 22. A bushing assembly 24 normally closes the rod end 22.

A piston assembly 26 is disposed within the cylinder 16 and is adapted to move relatively with respect to the cylinder 16 along an axis of movement 28, which is coaxial with the longitudinal axes of the cylinder and the piston assembly. A piston rod 32 is connected, in a conventional manner, at its reduced diameter end 34 with the piston assembly 26. The longitudinal axis of the rod 32 is also co-axial with the axis 28.

The piston rod 32 extends through the bushing assembly 24 and out of the rod end 22 of the cylinder 16. The rod's distal end 36 is connected with a conventional device, shown at 38, upon which the gas spring 14 exerts force when the gas spring is actuated. An example of such a device 38 is a trunk hood of an automobile, a hatch door of hatchback type vehicle, or the rear door or gate of a minivan or sport utility vehicle. When the gas spring 14 is used with such a device, the other end, not shown, of the gas spring 14 would be connected, through conventional means also are not shown, with the body of the vehicle.

The interior of the cylinder 16 is divided, by the piston assembly 26, into a compression chamber 42 and an expansion chamber 44. These chambers 42 and 44 are charged, during the gas spring's manufacture, with a relatively high pressure gas, usually nitrogen. As is typical for gas springs, the gas pressure would be in the 500–3,000 psi range. An amount of lubricating oil is also introduced into the cylinder 16 during manufacture to facilitate relative movement between the piston assembly 26 and the cylinder 16.

The piston assembly 26 include a first annular member 46, which is disposed adjacent to the expansion chamber 44, a second annular member 48, which is disposed adjacent to the compression chamber 42, a conventional O-ring 52, and a steel washer 54. The first member 46 includes a central, tubular extension 56 that extends toward the second member and that is spaced radially outwardly, from the adjacent, reduced diameter end 34 of the piston rod 32 so as to define an axial gas passage therebetween. The O-ring 52 and the washer 54 are mounted on and about the extension 56 for limited relative axial movement with respect to the extension 56. The O-ring 52 serves to prevent gas and oil from passing between the first member 46 and the cylinder 16. The distal end of the extension 56 and the second member 48 have a radial gas passage defined therebetween.

Gas in the cylinder 16 is permitted to flow between the outer periphery of the second member 48 and the cylinder 16, through the radial passage between the members 46 and 48, and through the axial passage between the extension of the first member 46 and the piston rod 32. As is conventional, when the gas spring 14 is in its dynamic mode or state, gas may pass, without restriction, from the compression chamber 42 to the expansion chamber 44 through the piston assembly 26 as the piston assembly moves relatively toward the closed end 18 of the cylinder 16. However, when the piston assembly 26 moves relatively toward the rod end 22 of the cylinder 16, the O-ring 52 and the washer 54 restrict the flow from the expansion chamber 44 to the compression chamber 42.

When the gas spring 14 is in a static mode or state, the gas in the chambers 42 and 44 will readily reach pressure equilibrium. The bushing assembly 24 will be exposed to full gas pressure at all times and must satisfactorily seal against gas leakage at all times to maintain the effectiveness of the gas spring.

The oil in the cylinder 16 is distributed throughout the cylinder 16. Oil tends, however, to collect adjacent to the bushing assembly 24, particularly when the gas spring is disposed generally vertically, that is, with its rod end 22 down. The pressure of the gas in the expansion chamber seeks to force the oil past the seal and bushing assembly 24.

As noted, the bushing assembly 24 receives the reciprocally movable piston rod 32. The assembly 24 includes a conventional, annular metal (normally brass) bushing member 58 that tightly fits about the piston rod 32 when it reciprocally moves, with respect to the cylinder 16, that is, when the gas spring is in its dynamic mode, and when the piston rod is not moving relative to the cylinder, that is, when the gas spring is in its static mode.

The bushing assembly 24 also includes the improved seal 12 of the present invention, which as noted, serves to minimize the leakage of gas and oil from the expansion chamber 44 out of the rod end 22 of the cylinder 16. As illustrated in FIG. 1, the seal 12 is disposed between the piston rod 32 and the cylinder 16 (or more particularly, between the inner facing surface of the wall of the cylinder).

Figure 2:
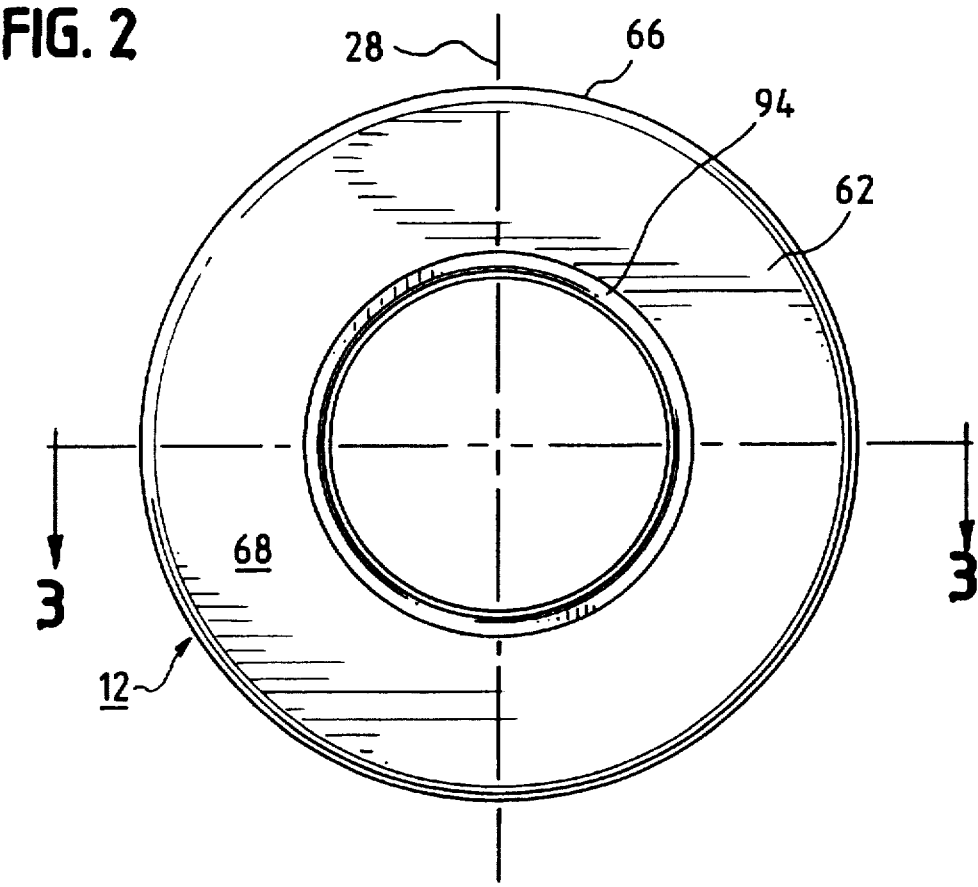
FIG. 2 is an axial, elevational view of an improved seal of the present invention.
Figure 3:
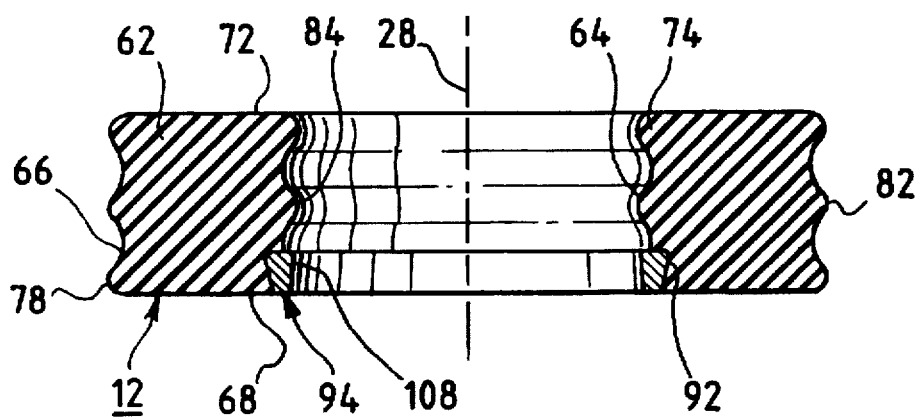
FIG. 3 is a cross-sectional view taken along the lines 3—3 of FIG. 2.

Referring now to FIGS. 2 and 3, the improved seal 12 includes a seal body 62 made from a conventional elastomeric material, such a rubber. The material may be the same as that used for prior quad gas spring seals. The durometer of the material should be between 60 and 90 depending on the particular application. Like the material used for other quad seals, the material used for the body 62 should have the ability to resist taking a compression set so as to avoid losing its installed pre-load. The tendency of the seal body 62 to be stretched to a relaxed state is overcome by a establishing its installed pre-load by its OD to the cylinder's ID compression and not by relying upon tensile loading of its ID through stretching it onto the piston rod's OD. In other words, if the compression set qualities are acceptable, the installed stress will remain stable for the life of the seal 12. An example of a material that may be used for the seal body 62 is Compound No. 558T marketed by Quadion Corporation, d/b/a Minnesota Rubber Co., of Minneapolis, Minn.

As best illustrated in FIG. 3, the body 62 has a radially inwardly facing surface 64, a radially outwardly facing 66, a first, front, axial facing surface 68 and a second, rear axial facing surface 72. A first, generally annular sealing lobe 74 is at the intersection of the inwardly facing surface 64 and the second axial surface 72. Two other, generally annular sealing lobes 76 and 78 are on the outwardly facing surface 66, with the sealing lobe 76 being at the intersection of the outwardly facing surface 66 and the axial surface 72 and with the sealing lobe 78 being at the intersection of the inwardly facing surface 66 and the axial surface 68. A central, generally annular sealing lobe 82 is on the outwardly facing surface 66, approximately midway between the sealing lobes 76 and 78. A second, central generally annular sealing lobe 84 is on the inwardly facing surface 64 approximately midway between the planes of the axial surfaces 68 and 72. The portions of the outwardly facing surface 66 between the sealing lobes 78 and 82 and between the sealing lobes 82 and 76 are at least in part concave. Similarly, the portion of the inwardly facing surface 64 between the sealing lobes 74 and 82 is at least in part concave.

The sealing lobes 76, 78, and 82 project radially outwardly from an imaginary annular plane of the surface 66, which plane may be defined as containing the average radial dimension of the surface 66, considering the sealing lobes 76, 78, and 82 and the portions therebetween. The sealing lobes 74 and 84 project radially inwardly from an imaginary annular plane of the surface 64, which plane may be defined as containing the average radial dimension of the surface 64, considering the sealing lobes 74 and 84 and the portion therebetween.

The sealing lobes 74, 76, 78, 82 and 84 are general convex in cross-sectional shape, as shown in FIG. 3. Testing has disclosed that preferably each of the sealing lobes 74, 76, 78, 82 and 84 should have the same radius (for their convex curvatures) and that that radius should be less than approximately 0.019 inches. In production, the radius of the sealing lobes may be reduced to a nominal 0.012 inch radius. When the radii of the sealing lobes exceeds 0.019 inches, tests have indicated that some oil seepage may occur. Using sealing lobes having such radii assures adequate localized stress so as to shear oil from the OD of the piston rod 32 under both static and dynamic conditions.

Testing has also demonstrated that the first and second axial surfaces 68 and 72 should preferably be generally flat or slightly crowned, but not concave as in the prior quad seals. As such and when unstressed, the planes of the axial surfaces 68 and 72 are generally perpendicular to the seal's longitudinal axis, which as noted above, is co-axial with the longitudinal axes of the piston rod 32 and the cylinder 16.

In use, the axial surface 72 is intended to be exposed to the relatively high pressure gas and oil in the expansion chamber 44 of the cylinder 16. The axial surface 68 is intended to be exposed to a much lower pressure, such as atmospheric pressure, when the seal 12 is employed in the gas spring 14.

A generally annular recess 92 is formed in the seal body 62 between the sealing lobe 84 and the intersection of the inwardly facing surface 64 and the axial surface 68. As shown in FIG. 3, the front "edge" of the recess 92 is preferably adjacent and co-planar with the unstressed axial surface 68. A generally annular wiper insert 94 is received and secured within this recess 92, which as illustrated in FIG. 3, conforms to the shape of the adjacent parts of the insert 94.

Figure 4:
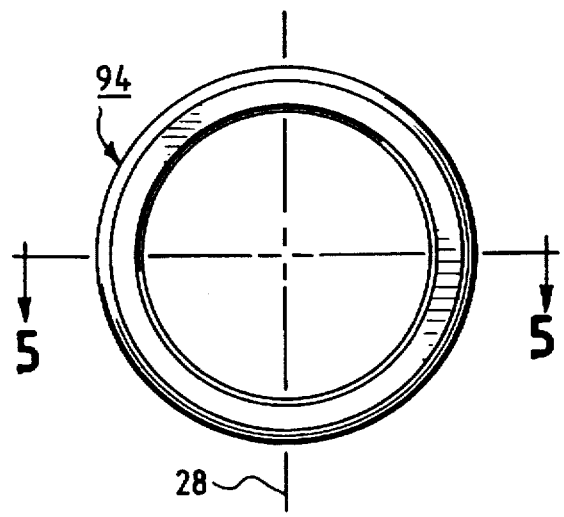
FIG. 4 is an axial, elevational view of the insert of, the improved seal of the present invention
Figure 5:
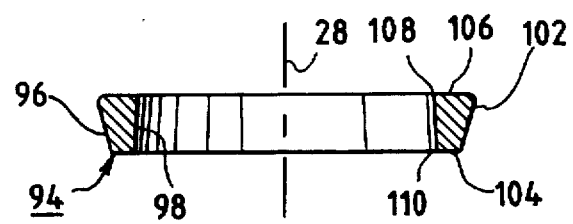
FIG. 5 is a cross-section view taken along the line 5—5 of FIG. 4.
Figure 6:
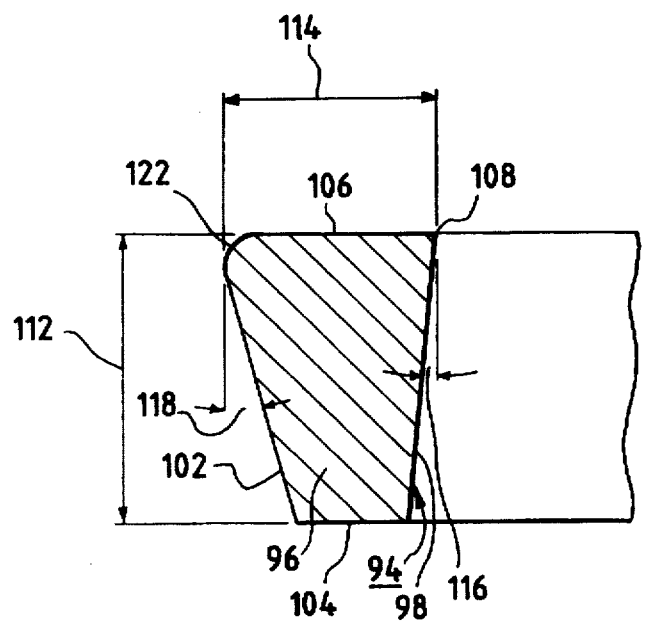
FIG. 6 is an enlarged, radial cross-sectional view of a portion of the insert of the present invention similar to FIG. 5.

Referring to FIGS. 4–6, the insert 94 includes a generally annular body 96 made from a relatively flowable plastic material, such as "PTFE". More specifically, the material could preferably be the PTFE polymer marketed by Hoechst Celanese Corporation of Somerville, N.J. or by E.I. DuPont de Nemours & Company of Wilmington, Del. under the "TEFLON" trademark.

The body 96 includes a generally radially inwardly facing surfacing 98, a generally radially outwardly facing surface 102, a first axial facing surface 104 and a second axial facing surface 106. The first axial surface 104 is adjacent and preferably co-planner with the axial surface 68 as shown in FIG. 3. The second axial surface 106 generally faces the sealing lobe 84. The intersection of the axial surface 106 and the outwardly facing surface 102 is radiused or rounded slightly. The plane of the outwardly facing surface 102 is sloped or angled with respect to a plane parallel to the axis of the seal 12. The surface 102 slopes toward the axial surface 104.

Similarly, the plane of the inwardly facing surface 98 slopes towards the axial surface 104 although the angle between the plane of the surface 98 and a plane parallel to the axis of the seal 12 is smaller than the slope or angle of the plane 102. As a result of the slope of the inwardly facing surface 98, a corner edge 108, which is defined by the intersection of the radially inwardly facing surface 98 and the axial surface 106, extends radially inwardly from the imaginary plane of the inwardly facing surface 64, such that the corner edge 108 is in the plane which is parallel to the axis of the seal 12 and which includes the radially most inwardly extending points or the tips of the sealing lobes 74 and 84. A second corner edge 110, which is defined by the intersection of the surfaces 98 and 104, is disposed in the plane of the unstressed axial surface 68.

The radial dimension of the surface 66 of the seal body 62 is greater than the radial dimension of the radial inwardly facing surface (which is adjacent to the seal body 62) of the cylinder 16, and the radial dimension of the surface 64 of the seal body 62 is less than the radial dimension of the radially outwardly facing surface (which is adjacent to the seal body 62) of the piston rod 32. More specifically, and in other words, the OD of the seal body 62 is selected, vis-a-vis the cylinder 16 in which the seal 12 will be disposed, so that ID of the cylinder is less than the OD of the seal body. When the seal 12 is properly positioned between the piston rod 32 and cylinder 16, the seal body 62 is compressed between the cylinder and the rod. This compression induces stress, sometimes called installed stress, in the seal body 62. The ID of the seal body 62 is selected so that it is slightly smaller than the OD of the piston rod 32, but the interference or overlap between this OD and ID is relatively minimal so that most of the installed stress induced in the seal body 62 (due to its being disposed between the cylinder and the rod) is caused by the compression of the seal between the cylinder and the rod.

As the seal 12 becomes loaded, both by the installed stress and by the differential pressures acting on its axial surfaces 68 and 72, the relative interference loads increase differentially as a result of the seal geometries and the properties of the seal body material. That is, the insert corner of the seal 12 (that is, the corner adjacent to the insert 94) is loaded at a rate higher than the seal's other corner (that is, the corner adjacent to the intersection of the surfaces 64 and 72). This differential loading tends to urge the surface 98 against the OD of the piston rod 32. This wedging action serves to wipe oil from the OD of the piston rod 32, and hence, minimizes seepage or leakage of the oil past the insert 94. That is not to say, however, that the sealing lobes 74, 76, 78, 82, and 84 do not also prevent leakage of oil from the cylinder 16—as well as preventing the leakage of the high pressure gas. Rather it is the synergistic combination of the wiping action of the insert 94, taken together with the stressed sealing between the sealing lobes 74 and 84 and the OD of the piston rod 32 and between the sealing lobes 76, 78 and 82 the ID of the cylinder that creates the extremely effective seal of the present invention.

As an example, the seal 12 may be made with the following dimensions: The radius of the plane of the outwardly facing surface 66 of the seal body 62 is 0.280 inches. The radius of the plane of the radially inwardly most extending parts or tips of the sealing lobes 74 and 84 (and the corner 108 of the insert 94) is 0.124/0.121 inches. The thickness of the seal body 62, as measured between the axial surfaces 68 and 72, is 0.168 inches. The radial thickness of the seal body 62, as measured from the tips of the sealing lobes 74 and 76, is 0.156 inches.

The axial thickness of the insert body 96, as measured between the axial surfaces 104 and 106 and as shown at 112 in FIG. 6, is 0.052 inches. The maximum radial thickness of the insert body 96, as measured adjacent to the plane of the axial surface 106 as shown at 114 in FIG. 6, is 0.035 inches. The slope of the inwardly facing surface 98, as shown at 116 in FIG. 6, is 5°, while the slope of the outwardly facing surface 102 is 15°, as shown at 118 in FIG. 6. As also shown at 122 in FIG. 6, the radius of the rounded intersection of the surface 102 and the axial surface 106 is 0.006 inches.

The above described seal 12 is intended for use in a gas spring where the ID of the cylinder 16 would be 0.507 inches, and where the OD of the piston rod 32 would be 0.250 inches.

The design (geometry) of the seal 12, and its component sealing lobes and surfaces, as described hereinabove, are such the upon the loading of the seal 12 (that is, when the seal 12 is compressed between cylinder 16 and the piston rod 32 and when the gas spring is charge by the introduction of gas under pressure within the chambers 42 and 44) effective static and dynamic gas and oil seals will be formed between the seal 12 and the cylinder 16 and between the seal 12 and the rod 32. Test and analyses indicate that the seal's effectiveness, particularly with respect to preventing leakage of oil and gas along the piston rod 32 results because the loading of the seal forces the surface 98 of the insert 94 against the adjacent surface of the piston rod. More specifically, the loading of the seal 12 causes a resultant force vector to act upon the corner 122 (generally in the direction toward the second corner edge 110) such that the surface 98 of the insert is urged toward against the rod 32.

Although it will be apparent to those working in the art to which this invention pertains that changes may be made in the above described embodiment of the invention, without departing from the scope of the invention, it is intended that the above description and drawings of the preferred embodiment be interpreted as illustrative and not in a limiting sense.

What is claimed is:

1. An improved seal adapted to prevent leakage of relatively high pressure gas and lubricating oil between a first inner member and second outer member, which members are annularly spaced and are relatively movable with respect to each other, the improved seal comprising:

a generally annular seal body that is made of an elastomeric material, that has a longitudinal axis and that includes a first, radically inwardly facing surface; a second, radially outwardly facing surface; a third, axial surface, and a fourth, axial surface; with the third and fourth surfaces being non-concave when unstressed;

the seal body having a first, generally annular sealing lobe at the intersection of the first and third surfaces; a second, generally annular sealing lobe at the intersection of the second and third surface; a third, generally annular sealing lobe at the intersection of the second and fourth surfaces; a fourth, generally annular sealing lobe in the second surface between the second lobe and the third lobe; and a fifth, generally annular, wiper and sealing lobe in the first surface approximately midway between the planes of the third and fourth axial surfaces, with the first lobe and the fifth lobe projecting radially inwardly; with the second lobe, the third lobe and the fourth lobe projecting radially outwardly; with the lobes being generally convex in cross-sectional shape, when unstressed; with the second surface between the second lobe and the fourth lobe and between the fourth lobe and the third lobe being generally, at least in part, concave, when unstressed; and with the first surface between the first lobe and the fifth lobe being generally at least in part concave when unstressed;

the seal body also having a generally annular recess opening in the first surface adjacent to the fifth lobe and to the intersection of the planes of the first surface and the fourth surface; and a relatively flowable plastic, generally annular insert disposed in the recess, with the insert having a radially inwardly facing surface; having first and second axially spaced and facing parallel surfaces, which are at least, in part, in contact with the seal body; having a first corner edge, which is defined by the intersection of the planes of the first axial surface and the inwardly facing surface and which projects radially inwardly; having the plane of the inwardly facing surface slope radially outwardly, with respect to the longitudinal axis of the seal body, from the first corner edge; and having a radially outwardly facing surface, which is in contact with seal body.

2. A The improved seal of claim 1 wherein the insert is made of PTFE material; and wherein the seal body is made of rubber.

3. The improved seal of claim 1 wherein the radii of the first and second lobes are generally the same.

4. The improved seal of claim 3 wherein when unstressed, the third and fourth surfaces are generally perpendicular to the seal axis; and wherein the radii of the first and second lobes are equal to or less than approximately 0.019 inches.

5. The improved seal of claim 1 wherein the insert has a second corner edge, which is defined by the intersection of the planes of the first axial surface and the outwardly facing surface of the insert; and wherein the plane of the outwardly facing surface of the insert is sloped radially inwardly, with respect to the longitudinal axis of the seal body, from the second corner edge.

6. The improved seal of claim 1 wherein the first corner edge of the insert is adjacent to the fifth lobe.

7. The improved seal of claim 1 wherein the first surface of the seal body is adapted to be disposed about and in sealing contact with radially outwardly facing surface of the first member; wherein the second surface of the seal body is adapted to be disposed within and in sealing contact with a radially inwardly facing surface of the second member; wherein the radial dimension of the first surface of the seal body is less than the radial dimension of the radially outwardly facing surface of the first member and the radial dimension of the second surface of the seal body is greater than the radial dimension of the radially inwardly facing surface of the second member; and wherein the radial dimensions of the first and second surfaces of the seal body are selected so that when the seal is disposed between the radially outwardly facing surface of the first member and the radially inwardly facing surface of the second member, the induced forces in the seal body are mostly caused by the compression of the seal body between the first and second members.

8. The improved seal of claim 1 wherein the insert is made of PTFE material; wherein the seal body is made of rubber; and wherein the radii of the first and second lobes are generally the same.

9. The improved seal of claim 8 wherein first surface of the seal body is adapted to be disposed about and in sealing contact with a radially outwardly facing surface of the first member; wherein the second surface of the seal body is adapted to be disposed within and in sealing contact with a radially inwardly facing surface of the second member; wherein the radial dimension of the first surface of the seal body is less than the radial dimension of the radially outwardly facing surface of the first member and the radial dimension of the second surface of the seal body is greater than the radial dimension of the radially inwardly facing surface of the second member; and wherein the radial dimensions of the first and second surfaces of the seal body are selected so that when the seal is disposed between the radially outwardly facing surface of the first member and the radially inwardly facing surface of the second member, the induced forces in the seal body are mostly caused by the compression of the seal body between the first and second members.

10. The improved seal of claim 9 wherein the first corner edge of the insert is adjacent to the fifth lobe; wherein the radii of the first and second lobes are generally equal to or less than approximately 0.019 inches; wherein when unstressed, the third and fourth surfaces are generally perpendicular to the longitudinal axis; wherein the insert has a second corner edge, which is defined by the intersection of the planes of the first axial surface and the outwardly facing surface of the insert; and wherein the plane of the outwardly facing surface of the insert is sloped radially inwardly, with respect to the longitudinal axis of the seal body, from the second corner edge toward the second axial surface of the insert.

11. In a gas spring having an annularly spaced, axially relatively movable cylinder and piston rod, which gas spring contains relatively high pressure gas and lubricating oil, the improvement comprising a seal for sealing between the relatively movable cylinder and piston rod so as to minimize the leakage of the relatively high pressure gas and the lubricating oil out of the rod end of the gas spring, the seal having:

a generally annular seal body that is made of an elastomeric material, that has a longitudinal axis generally parallel to the axis of movement of the piston rod and cylinder, and that includes a first, radially inwardly facing surface, which is disposed about and in sealing contact with a radially outwardly facing surface on the piston rod of the gas spring; a second, radially outwardly facing surface, which is disposed within and in sealing contact with a radially inwardly facing surface on the cylinder of the gas spring; a third, axial surface, which is to be exposed to the relatively high pressure gas in the gas spring cylinder; and a fourth axial surface which is to be exposed to a relatively lower pressure;

the seal body having a first, generally annular sealing lobe at the intersection of the first and third surfaces; a second, generally annular sealing lobe at the intersection of the second and third surfaces; a third, generally annular sealing lobe at the intersection of the second and fourth surfaces; a fourth, generally annular sealing lobe in the second surface between the second sealing lobe and the third lobe; and a fifth, generally annular sealing lobe in the first surface approximately midway between the planes of the third and fourth axial surfaces, with the first sealing lobe and the fifth sealing lobe projecting radially inwardly, and with the second sealing lobe, the third sealing lobe and the fourth sealing lobe projecting radially outwardly;

the seal body also having a generally annular recess opening in the first surface adjacent to the fifth sealing lobe; and a relatively flowable plastic, generally annular insert disposed in the recess, with the insert having a central annular axis, having a radially outwardly facing surface, having a first axial facing surface, having a radially inwardly facing surface and having a first corner edge, which is defined by the intersection of the planes of the first axial surface and inwardly facing surface and which is disposed radially inwardly beyond the plane of the first surface of the seal body, and having the plane of the inwardly facing surface slope radially outwardly, with respect to the longitudinal axis of the seal body, from the first corner edge; with the shape of the seal body and the radial dimensions of the first and second surfaces of the seal body being selected, with respect to the radial dimensions of the radially outwardly facing surface of the piston rad and the radially inwardly facing surface of the cylinder, respectively, so that when the seal is disposed for sealing between the piston rod and the cylinder, forces will be induced in the seal body, primarily from the compression of the seal between the cylinder and piston rod and from gas loading whereby the leakage between the seal body and the cylinder and between the seal body and the piston rod will be minimized because, in part, the induced forces will tend to rotate the insert, about the annular axis of the insert and with respect to the radially outwardly facing surface of the piston rod, such that the first corner edge of the insert will bear against the radially outwardly facing surface of the piston rod so as to minimize leakage of oil between the first corner edge and the radially outwardly facing surface of the piston rod.

12. The gas spring of claim 11 wherein the first corner edge of the insert is adjacent to the fifth lobe; and wherein when unstressed, the third and fourth surfaces are generally non-concave and are generally perpendicular to the longitudinal axis.

13. The gas spring of claim 11 wherein the first and second lobes are generally convex in cross-sectional shape when unstressed; and wherein the radii of the first and second lobes are generally the same.

14. The gas spring of claim 13 wherein the radii of the first and second lobes are generally equal to or less than approximately 0.019 inches; wherein the insert has a second corner edge, which is defined by the intersection of the planes of the first axial surface and the outwardly facing surface; and wherein when the seal is unstressed, the plane of the outwardly facing surface of the insert is sloped radially inwardly, with respect to the longitudinal axis of the seal body, from the second corner edge.

15. The gas spring of claim 11 wherein the insert is made of PTFE material; and wherein the seal body is made of rubber.

16. The improved seal of claim 11 wherein the radial dimension of the first surface of the seal body is less than the radial dimension of the radially outwardly facing surface of the piston rod and the radial dimension of the second surface of the seal body is greater than the radial dimension of the radially inwardly facing surface of the cylinder; and wherein the radial dimensions of the first and second surfaces of the seal body are selected so that when the seal is disposed between the radially outwardly facing surface of the piston rod and the radially inwardly facing surface of the cylinder are mostly caused by the compression of the seal body between the piston rod and cylinders.

17. The gas spring of claim 11 wherein the insert is made of PTFE material; wherein the first corner edge of the insert is adjacent to the fifth lobe; wherein the insert has a second corner edge, which is defined by the intersection of the planes of the first axial surface and the outwardly facing surface; and wherein the radii of the first and second lobes are generally the same.

18. The gas spring of claim 17 wherein the radial dimension of the first surface of the seal body is less than the radial dimension of the radially outwardly facing surface of the piston rod and the radial dimension of the second surface of the seal body is greater than the radial dimension of the radially inwardly facing surface of the cylinder; and wherein the radial dimensions of the first and second surfaces of the seal body are selected so that when the seal is disposed between the radially outwardly facing surface of the piston rod and the radially inwardly facing surface of the cylinder, the induced forces in the seal body are mostly caused by the compression of the seal body between the cylinder and the piston rod; and wherein lobes are generally convex in cross-sectional shape, when unstressed.

19. The gas spring of claim 18 wherein the first and second lobes are generally convex in cross-sectional shape when unstressed; wherein the radii of the first and second lobes are equal to or less than approximately 0.019 inches; wherein the seal body is made of rubber; wherein when unstressed, the third and fourth surfaces are generally non-concave and are generally perpendicular to the longitudinal axis; and wherein when the seal is unstressed, the plane of the outwardly facing surface of the insert is sloped radially inwardly, with respect to the longitudinal axis of the seal body, from the second corner edge toward the second axial surface of the insert.

* * * * *